UNITED STATES PATENT OFFICE.

JACOB REESE, OF PITTSBURG, ASSIGNOR TO THE BESSEMER STEEL COMPANY, LIMITED, OF PHILADELPHIA, PENNSYLVANIA.

BASIC LINING.

SPECIFICATION forming part of Letters Patent No. 481,869, dated August 30, 1892.

Application filed February 15, 1882. Serial No. 52,778. (No specimens.)

*To all whom it may concern:*

Be it known that I, JACOB REESE, a citizen of the United States, residing at Pittsburg, in the county of Allegheny and State of Pennsylvania, have invented certain new and useful Improvements in Basic Linings for Bessemer Converters, Open Hearths, and other Metallurgical Apparatus; and I do hereby declare the following to be a full, clear, and exact description thereof, which will enable others skilled in the art to make and use the same.

This invention relates to the manufacture of highly-shrunk, hard, indurated, and durable calcareous or calcareous-magnesian basic linings for Bessemer converters, open-hearth furnaces, cupolas, and other furnaces wherein a high heat is maintained and where a highly-basic slag is desired. The linings are made of a comparatively good quality of highly-burned lime or magnesian lime admixed with petroleum, tar, asphaltum, or other carbonaceous material and then subjected to a gradually-increasing temperature until the substance has become thoroughly shrunk, hardened, glazed, and indurated.

It is a very well-known fact that an exceedingly high temperature is developed in the Bessemer converter and open-hearth practice, and it is also known that lime or magnesian lime will stand a very high temperature before fusion takes place. Therefore it has been proposed to form a pure lime lining or a magnesian-lime lining or a carbonate-of-lime (chalk) lining; but it has never been proposed, so far as I am aware, to form a lime lining or a magnesian-lime lining previous to this invention by mixing a highly-burned lime or magnesian lime with petroleum, tar, asphaltum, or other carbonaceous matter until the mixture has assumed a stiff plastic condition and from the mass to form a lining and subject it to a gradually-increasing temperature until a very high degree is attained and until the material has become thoroughly shrunk, hardened, glazed, and indurated.

My invention consists in a basic lining composed, essentially, of calcareous or calcareous-magnesian material which has been burned at a very high temperature.

My invention also consists of a lining composed of this highly-burned lime mixed with petroleum, tar, asphaltum, or other carbonaceous matter until the mixture is in a stiff plastic condition.

My invention also consists of a lining composed of a mixture of this highly-burned lime with tar or other adhesive carbonaceous substance and then subjected to a gradually-increasing temperature until it has assumed a highly-shrunk, solidified, and indurated character.

In the practice of my invention I prepare the lining material by taking a pure quality of limestone or dolomite and burning it at as high a temperature as can be attained in a cupola or other furnace. This highly-burned lime or lime which has been burned at a high temperature should be ground or pulverized and mixed with petroleum, tar, or asphaltum, either separately or together; but if the latter alone is used I prefer to heat the calcareous material previous to or during the mixing operation. When the material has been well mixed and has assumed a tough plastic condition, the tuyeres having been placed in the converter, the plastic calcareous material is put in between the tuyeres and well rammed down until the bottom lining is formed. The converter is then turned with its bottom up, a core of wood or iron is placed within it, and the plastic calcareous material put in by degrees and well rammed down until the converter-shell-lining is formed. The core may then be withdrawn, or if a wooden core is used it may be left in. The bottom should then be put on and secured and the joint well rammed with the plastic material. After this the converter may be turned up and a small fire kindled within it and the temperature gradually increased until the lining is dried and has acquired a red heat.

In securing the required temperature during the drying and indurating of the lining fuel may be placed in the converter, as usually practiced; but I have found that I could secure an exceedingly-high temperature by injecting petroleum or the vapor of petroleum into the converter with the blast, and I prefer the latter, as it is free from earthy matter and appears to aid the fusion of the lime additions and the glazing of the lining. Having discovered that a lining formed of the old lime linings ground up and mixed with a carbonaceous fluid until the mixture became plastic did not shrink as much as that made from ordinary burned lime, I concluded to burn the lime at a high temperature, and with this in view I charged limestone and coke into a lime-lined cupola and subjected it to a very high temperature. I also burned lime in this manner, and in addition to the coke I injected petroleum and the vapor of petroleum into the cupola below the blast-horizon. The material after cooling was ground, mixed with oil or tar, and formed into linings, as before described. This method of burning the calcareous material at a high temperature indurates it, so that it absorbs but little moisture and shrinks but little when formed into linings.

In applying a lime lining to an open hearth I take the plastic calcareous material prepared as before described and tamp it down on the bottom and up the sides to the proper height. On the top of the side lining I place about one-half an inch of plumbago or good coke-dust, and on this carbonaceous layer I place the fire-brick or sand-brick forming the sides of the furnace, and on which the roof is built, or the side walls may be made to rest on an inner wall or plate and so constructed as to project over the calcareous lining, as now practiced in lining puddling-furnaces; but in either case I recommend an intervening layer of carbonaceous matter between the calcareous lining and the silicious brick in order to prevent fluxing—an operation that would otherwise ensue. When the furnace is built entirely of lime, brick, and calcareous matter, the plumbago may be omitted. When the lining is thus formed and the furnace is finished, a fire is started in it and the temperature is gradually raised until it is dried and the lining is shrunk, hardened, and glazed, when the furnace will be ready for use.

Having described my invention, what I claim, and desire to secure by Letters Patent, is—

A basic lining composed of a mixture of previously highly-fired, shrunk, and indurated lime and an adhesive carbonaceous substance, substantially as described.

JACOB REESE.

Witnesses:
FRANK M. REESE,
WALTER REESE.